(12) United States Patent
Greer

(10) Patent No.: US 7,814,964 B2
(45) Date of Patent: Oct. 19, 2010

(54) ISOLATION VALVE FOR MAIN AND AUXILIARY VEHICLE AIR CONDITIONING SYSTEM

(76) Inventor: J. Rex Greer, P.O. Box 1384, Corrales, NM (US) 87048

( * ) Notice: Subject to any disclaimer, the term of this patent is extended or adjusted under 35 U.S.C. 154(b) by 1216 days.

(21) Appl. No.: 11/237,984

(22) Filed: Sep. 29, 2005

(65) Prior Publication Data

US 2007/0068667 A1 Mar. 29, 2007

(51) Int. Cl.
*B60H 1/00* (2006.01)
(52) U.S. Cl. .......................... 165/42; 165/43; 165/202; 165/203; 62/236; 62/244; 137/595; 137/625.19
(58) Field of Classification Search .................. 165/42, 165/43, 202, 203; 62/236, 244; 137/595, 137/625.19
See application file for complete search history.

(56) References Cited

U.S. PATENT DOCUMENTS 2,751,155 A * 6/1956 Collat ...................... 236/46 R
3,098,506 A * 7/1963 Spragens ................ 137/625.19
3,698,428 A * 10/1972 Gastin ......................... 137/595
4,682,649 A * 7/1987 Greer ............................ 165/43
4,732,229 A * 3/1988 Lucht ......................... 180/69.6
4,825,663 A * 5/1989 Nijjar et al. ................... 62/236
4,947,657 A * 8/1990 Kalmbach .................... 62/236
5,314,007 A * 5/1994 Christenson ................. 165/43

FOREIGN PATENT DOCUMENTS

| JP | 61259045 A | * | 11/1986 |
| JP | 2000127753 A | * | 5/2000 |
| JP | 2003146061 A | * | 5/2003 |

* cited by examiner

*Primary Examiner*—John K Ford
(74) *Attorney, Agent, or Firm*—James G. O'Boyle

(57) ABSTRACT

A rotatable electrically actuated valve having a spindle with axially spaced grooves and lands constructed and arranged to selectively connect an auxiliary air conditioning system to a truck cab while isolating the truck air conditioning system, and for connecting the truck air conditioning system to the truck cab, while isolating the auxiliary air conditioning system.

2 Claims, 2 Drawing Sheets

ISOLATION VALVE FOR MAIN AND AUXILIARY VEHICLE AIR CONDITIONING SYSTEM

BACKGROUND OF THE INVENTION

An auxiliary air conditioning, heating and engine warming system for trucks is disclosed in my U.S. Pat. No. 4,682,649 dated Jul. 28, 1987, the disclosure of which is incorporated herein by reference.

Basically, main and auxiliary vehicle air conditioning systems operate in such a way that when the truck is running, as when the truck is traveling or stopped for a short time period only, the truck air conditioning and heating systems operate in a conventional manner to supply conditioned air or warm air to the truck cab and/or sleeping compartment. At this time, the auxiliary power plant is inactive and has no effect on the operation of the truck air conditioning and heating systems or its electrical system.

When the truck stops for a lengthy period and its engine is turned off, the auxiliary air conditioning system is activated to not only supply conditioned air to the truck cab and/or sleeping compartment but also for warming the truck engine and its fuel lines.

In the system disclosed in my aforementioned patent, a pair of cut-off valves were provided in the refrigerant pressure lines for isolating the main air conditioning system from the auxiliary air conditioning system or for isolating the auxiliary air conditioning system from the main conditioning system.

After considerable research and experimentation, the isolation valve of the present invention has been devised for replacing the pair of cut-off valves disclosed in my aforementioned patent.

SUMMARY OF THE INVENTION

The isolation valve of the present invention comprises, essentially, a rotary solenoid actuated spindle rotatably mounted in a housing. The spindle has axially spaced lands and grooves wherein the grooves are constructed and arranged to selectively connect the auxiliary air conditioning system to the truck cab while isolating the truck air conditioning system, and for connecting the truck air conditioning system to the truck cab while isolating the auxiliary air conditioning system. By this construction and arrangement, if one system develops a leak, the particular system can be isolated.

DETAILED DESCRIPTION OF THE PREFERRED EMBODIMENT

Figure 1:
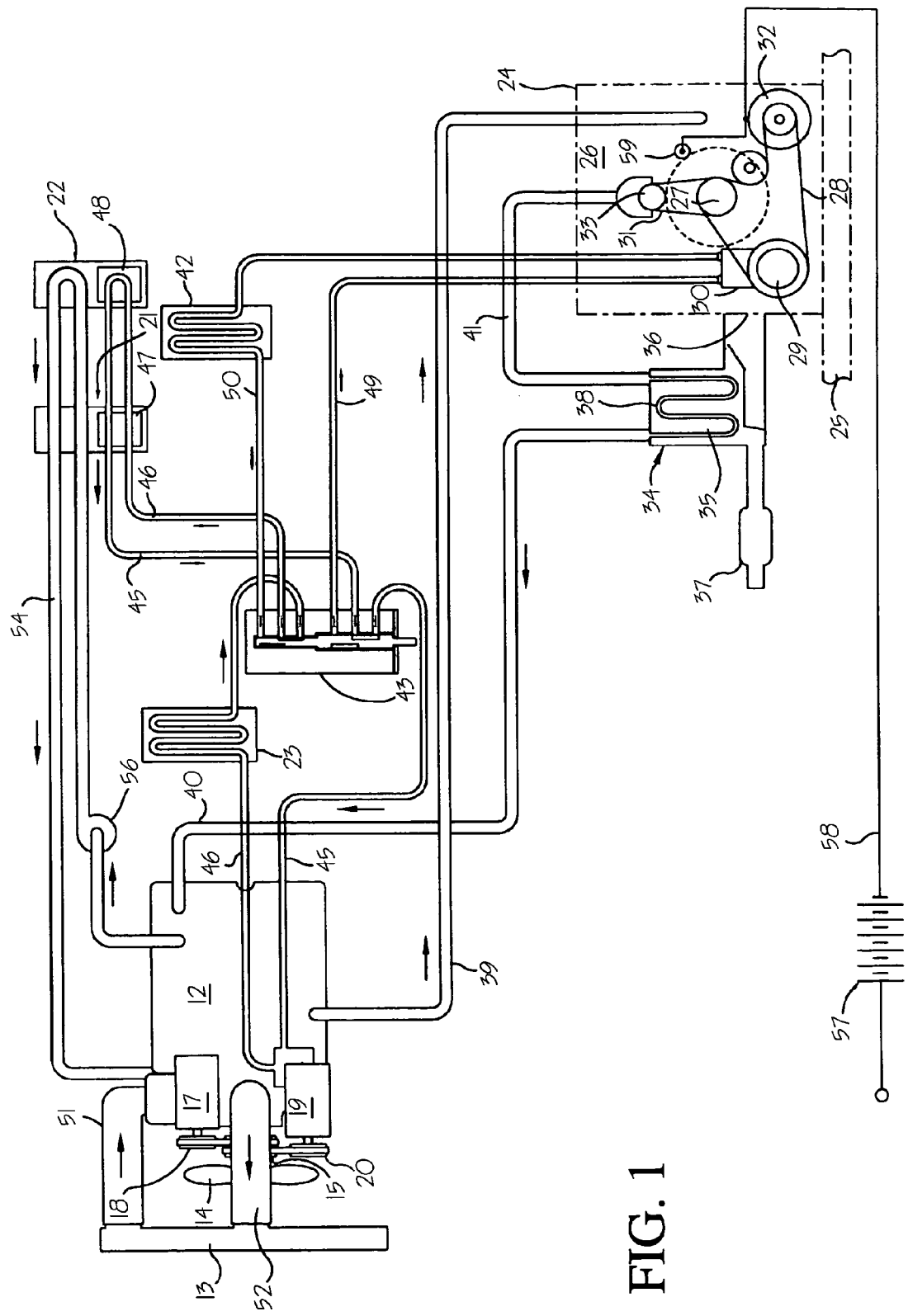
FIG. 1 is a schematic drawing of a truck air conditioning system and heating system and an auxiliary power plant for such system including the isolation valve of the present invention.

Referring to the drawings, and more particularly FIG. 1, a truck engine 12 is equipped with a radiator 13, behind which is located the usual fan 14 driven by a pulley means 15 on the engine crank shaft. A truck alternator 17 is operated by a drive belt and pulley 18 driven by the pulley means 15. Similarly, a truck air conditioning compressor 19 is operated by a belt and pulley 20 driven by the pulley means 15.

The truck cab is equipped with a dash-mounted conventional ac/heater unit 21, and a separate ac/heater unit 22 is provided in the sleeping compartment of the truck tractor. The truck air conditioning condenser 23 may be grill or roof mounted, as found desirable. When grill mounted, an electric temperature controlled fan, not shown, is added to cool the condenser while the vehicle is stationary, or the truck engine fan 14 can be replaced by a full electric fan.

An auxiliary power plant 24 includes a suitable supporting and unitizing frame, and may be mounted at any convenient location on the truck tractor, such as behind the cab on the tractor main frame, or in the location of the customary cab step.

The auxiliary power plant 24 comprises a small engine 26, such as a Kubota diesel engine or an equivalent engine. The engine 26 drives a crank shaft pulley 27 connected through a belt 28 with a pulley 29 of the power plant compressor 30. Another belt 31, driven by the crank shaft pulley 27, drives a power plant alternator 32 and also drives a power plant water pump 33.

A power plant heat exchanger 34 includes a chamber 35 receiving hot exhaust gases from an exhaust port 36 of the power plant engine 26. From the chamber 35, the spent exhaust gases pass to a muffler 37, which, for added safety, is preferably connected into the customary vertical exhaust stack of the truck.

Within the chamber 35, the heat exchanger 34 includes heat exchanger coils 38 preferably formed of copper and being of any thermally efficient shape, such as wide, flat, thin coils.

A preferably insulated conduit 39 leads from the water jacket of the truck engine 12 to the inlet end of the auxiliary engine 26 water jacket and another insulated conduit 40 leads from the outlet end of the heat exchanger coil 28 back to the water jacket of truck engine 12. A branch conduit 41 interconnects the power plant water pump 33 with the water return conduit 40.

Air conditioning pressure lines 45 and 46 lead from the truck compressor 19 through the truck cab and sleeper compartment ac units 47 and 48, each having their own controls, and from these units back to the truck compressor 19. The return refrigerant line 45 is connected to the isolation valve 43 of the present invention which is also connected with the return refrigerant line 49.

Auxiliary air conditioning pressure lines 49 and 50 lead to and from the power plant compressor 30 through an auxiliary air conditioning condenser 42 and are connected by the isolation valve 43 with the truck air conditioning pressure lines 45 and 46, respectively.

Existing truck heater hoses 54 and 55 extend to and from the truck engine water cooling system and pass serially through the truck cab dash-mounted and sleeper compartment heater units having their own heater controls, as shown. A circulating pump 56 is connected in the heater hose 55, with a control switch on the power plant panel, not shown, which control panel can be located at any convenient point on the truck. The power plant control panel is wired into the truck electrical system so that the power plant alternator 32 charges the existing truck storage batteries 57, which are the only batteries employed in the entire system. When the truck engine 12 is not operating, the power plant alternator 32 operates the total electrical system embodied in the invention.

A cable 58 interconnects the truck storage batteries with a conventional starter 59 of power plant engine 26.

Figure 3:
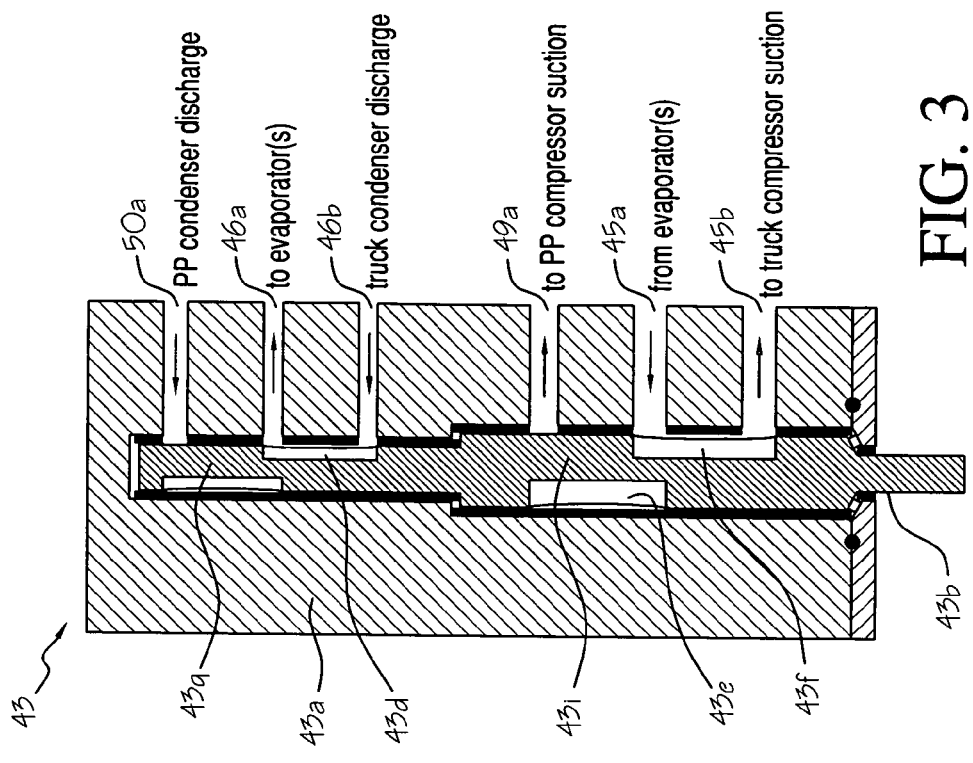
FIG. 3 is a sectional side elevational view of the isolation valve shown in FIG. 2 but shifted to a position where the auxiliary system is shut off and communication is established between the truck sleeper air conditioning units and the truck compressor discharge and suction sides.
Figure 2:
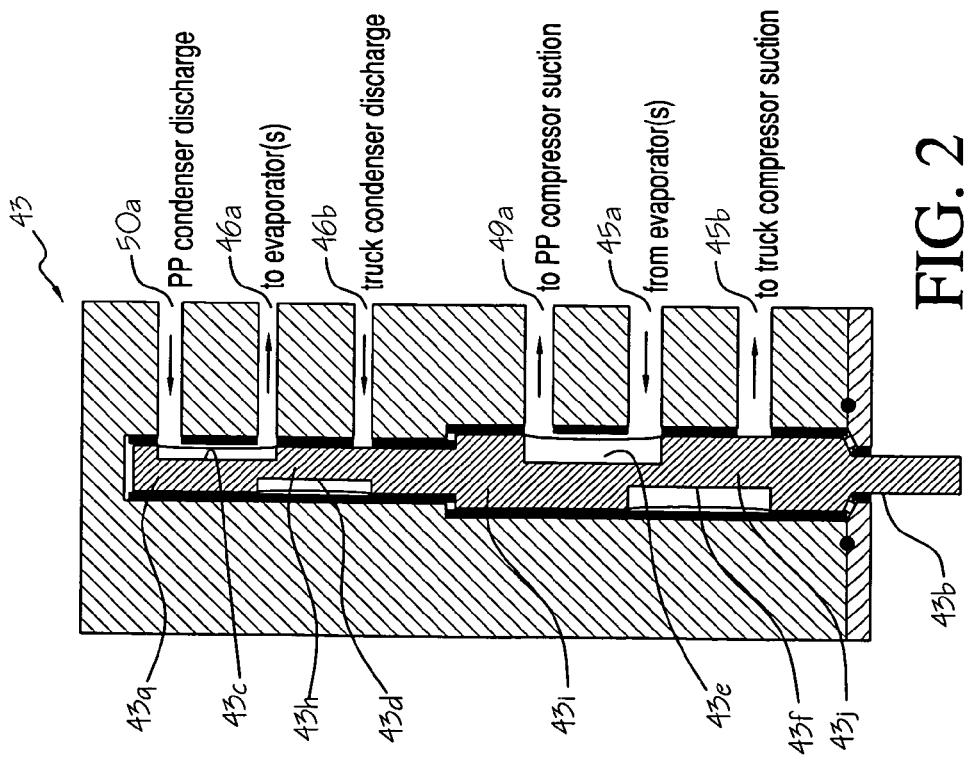
FIG. 2 is a sectional side elevational view of the isolation valve employed in the system, illustrated in FIG. 1, showing the valve in a position communicating the auxiliary compressor discharge to the truck sleeper air conditioning units and communicating the discharge from the truck sleeper air conditioning units to the suction side of the auxiliary compressor, while simultaneously closing off the truck compressor discharge and suction ports.

The details of the construction of the isolation valve 43 of the present invention are illustrated in FIGS. 2 and 3. The isolation valve comprises a single housing 43a having a plurality of ports 50a, 46a, 46b and 45a, 49a, and 45b communicating respectively with the auxiliary power plant compressor discharge line 50, the evaporator inlet line 46, the truck compressor discharge line 46, the auxiliary power plant compressor suction line 49, the evaporator discharge line 45, and the truck compressor suction line 45. A spindle 43b is rotatably mounted in the housing 43 and is provided with grooves 43c and 43d, 43e, 43f and lands 43e, 43f, 43g, 43h 43g, 43h, 43i, 43j constructed and arranged so that when the spindle 43b is rotated to the position shown in FIG. 2. The auxiliary power plant compressor 30 discharge and suction lines are connected to the evaporators 47 and 48 through the spindle grooves 43c 43e and 43c, while lands 43h and 43i close the ports 46b and 45b communicating with the truck compressor discharge and suction lines 46 and 45.

When the spindle 43b has been rotated to the position shown in FIG. 3, the truck compressor 19 discharge and suction lines are connected to the evaporators 47 and 48 through the spindle grooves 43d, while lands 43i and 43g close the ports 49a and 50a communicating with the auxiliary power plant discharge and suction lines 50 and 49.

Operation

When the truck engine 12 is running, as when the truck is traveling or stopped for a short time period only, the truck air conditioning and heating systems operate in a conventional manner to supply conditioned air or warm air to the truck cab and/or sleeping compartment through the individually controllable units 21 and 22. At this time, the isolation valve is in the position shown in FIG. 3 and the auxiliary power plant including its small engine 26 is inactive and has no effect on the operation of the truck air conditioning and heating systemns or its electrical system.

When the truck stops for a lengthy period and its engine 12 is shut off, the operation of the truck alternator 17 and compressor 19 of course ceases. At this time, the isolation valve 43 is rotated to the position shown in FIG. 2 and the auxiliary power plant 24 is activated by starting its relatively small engine 26, which activates the alternator 32, water pump 33 and the compressor 30 whenever air conditioning of the truck cab and/or sleeping compartment is demanded. When it is demanded, the connections of the pressurized freon lines 49 and 50 through the isolation valve 43 will supply air conditioning in the same manner that it would ordinarily be supplied by the truck system including the compressor 19.

Simultaneously, the circulating pump 33 constantly draws water from the truck engine water cooling system and pumps it through the coil 38 of the power plant heat exchanger 34 and back to the truck engine, whereby proper heating of the cab and/or sleeping compartment is made available on demand even though the truck engine is not operating.

The heat of the exhaust gases from the power plant engine 26 is utilized to heat the water flowing through the heat exchanger coil 38 in a continuous and efficient manner as long as the small engine 26 operates.

Additionally, the heated water flowing to and from the water jacket of the truck engine 12 through the insulated conduits 40 and 39 maintains the truck engine warm so that it will start quickly even in very cold weather. The provision of the additional circulating pump 56 in the existing truck heater conduit system renders the operation of the invention even more efficient.

While the isolation valve 43 is connected to the electrical system of the truck and is actuated by a switch manually actuated by the truck operator, pressure switches can also be wired into the system so that if, for instance, the auxiliary compressor system should develop a leak, the isolation valve 43 would be automatically rotated to the position shown in FIG. 3 and would be prevented from rotating to the position shown in FIG. 2 until the leak has been repaired.

I claim:

1. A system comprising an isolation valve in combination with a main and auxiliary vehicle air conditioning system having a vehicle engine connected to a vehicle compressor having a discharge line and a suction line, an air conditioning condenser, refrigerant lines extending from the vehicle compressor through said air conditioning condenser to an air conditioning unit in the vehicle, said air conditioning unit having an inlet line extending from said air conditioning condenser to said vehicle air conditioning unit and a discharge line extending back to the vehicle compressor; an auxiliary power plant on the vehicle including an auxiliary engine connected to an auxiliary compressor having a discharge line and a suction line, an auxiliary air conditioning condenser, auxiliary refrigerant lines extending from the auxiliary compressor through said auxiliary air conditioning condenser to said vehicle air conditioning unit and extending from the vehicle air conditioning unit back to the auxiliary compressor, whereby refrigerant can be independently supplied to the vehicle air conditioning unit from the auxiliary compressor of the auxiliary power plant when the auxiliary power plant is operated; and a single isolation valve body having four separate valves contained therein in the refrigerant lines between the vehicle compressor and said air conditioning unit and between the auxiliary compressor and said air conditioning unit for restricting back flow of refrigerant between the two said compressors, said isolation valve comprising an electrically operated spindle rotatably mounted in said body, said body having a plurality of ports communicating with the auxiliary compressor discharge line, the vehicle air conditioning unit inlet line, the vehicle compressor discharge line, the auxiliary compressor suction line, the discharge line of said air conditioning unit, and the vehicle compressor suction line; said spindle having a plurality of grooves and lands providing four separate valves arranged and configured to simultaneously and selectively open and close the body ports such that the auxiliary refrigerant compressor and auxiliary air conditioning condenser are connected to said air conditioning unit while isolating the vehicle compressor and air conditioning condenser, or the vehicle compressor and air conditioning condenser are connected to said air conditioning unit while isolating the auxiliary refrigerant compressor and auxiliary air conditioning condenser.

2. An air conditioning, heating and engine warming system for trucks and like vehicles comprising:

an engine including a block connected to a radiator; an engine and truck air conditioning system and heating system including a truck compressor, a condenser, refrigerant lines extending from the truck compressor to at least one air conditioning unit via the condenser and extending from the at least one air conditioning unit back to the truck compressor, and heater conduits extending from the engine block to at least one heating unit and extending back to the engine block; an auxiliary power plant on the truck including an auxiliary engine, auxiliary alternator, auxiliary coolant system including an auxiliary water pump and an auxiliary compressor each driven by the auxiliary engine, and a heat exchanger having a chamber located immediately adjacent the auxiliary engine for receiving hot exhaust gases therefrom and having a liquid heating coil within the chamber in heat transfer relationship with the exhaust gases, a first coolant conduit coupled from the engine block to one side of the heating coil of the heat exchanger and a second coolant conduit coupled back to the engine block, said second coolant conduit being coupled to the other side of said heating coil, said auxiliary water pump connected in said first conduit between the engine block and the heating coil; the return of heated water to the engine block from said second conduit acting to warm the engine block and thus aid starting the truck engine in cold weather when the auxiliary power plant is operated; additional refrigerant lines coupling the auxiliary compressor of the auxiliary power plant to refrigerant lines connecting said at least one air conditioning unit to an auxiliary condenser of said auxiliary power plant when said auxiliary power plant is operated; and a single isolation valve body having four separate valves contained therein in the refrigerant lines between the truck compressor and said at least one air conditioning unit and between the auxiliary compressor of the auxiliary power plant and said at least one air conditioning unit for restricting back flow of refrigerant between the two said compressors, said isolation valve comprising an electrically operated spindle rotatably mounted in said body, said body having a plurality of ports communicating with an auxiliary compressor discharge line, an at least one vehicle air conditioning unit inlet line, a truck compressor discharge line, an auxiliary compressor suction line, a discharge line of said at least one air conditioning unit, and a truck compressor suction line; said spindle having a plurality of grooves and lands providing four separate valves arranged and configured to simultaneously and selectively open and close the body ports such that the auxiliary refrigerant compressor and auxiliary air conditioning condenser are connected to the said at least one air conditioning unit while isolating the truck compressor and air conditioning condenser, or the truck compressor and condenser are connected to said at least one air conditioning unit while isolating the auxiliary refrigerant compressor and auxiliary condenser.

* * * * *